Patented Dec. 10, 1929

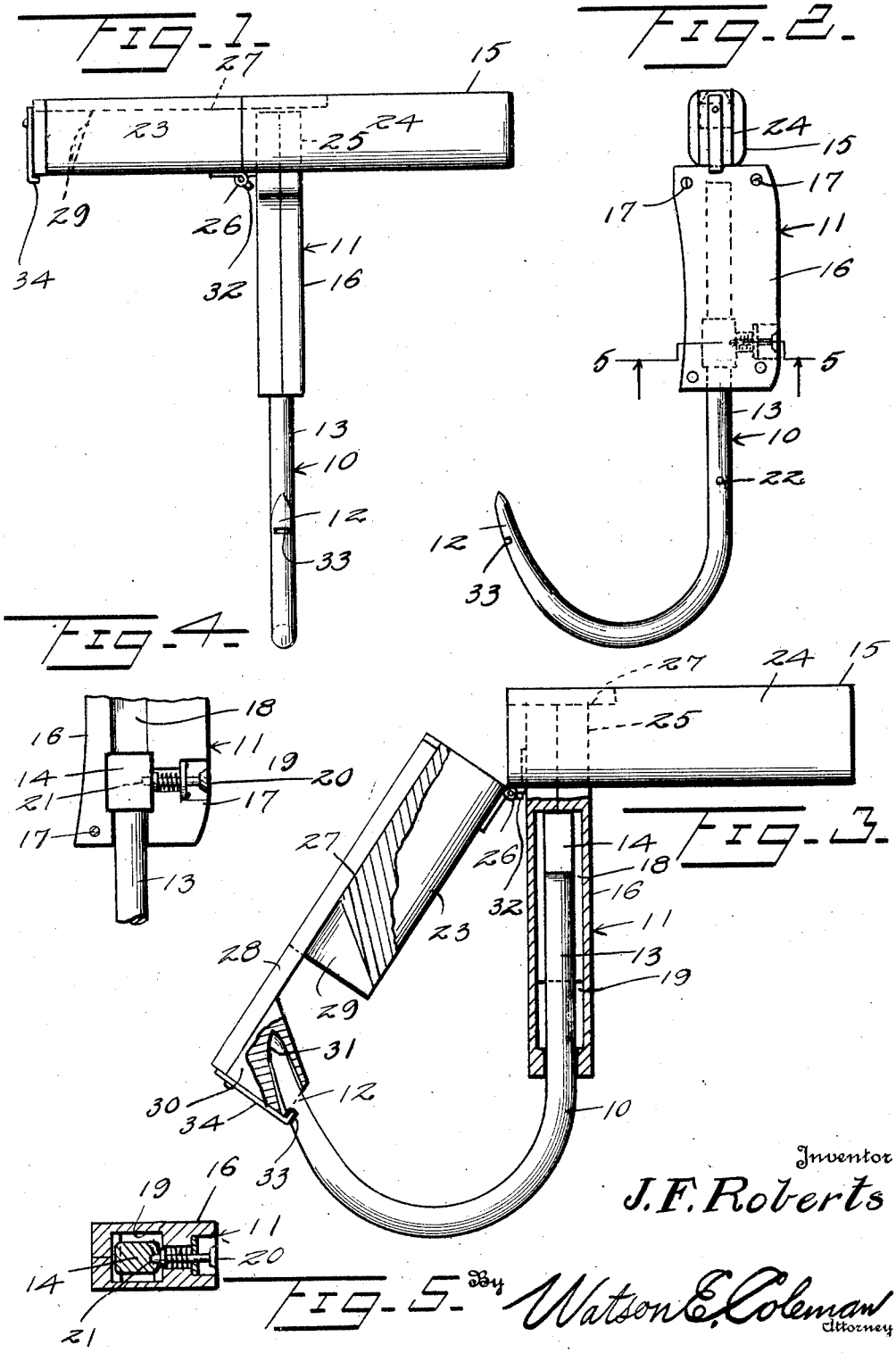

1,738,844

UNITED STATES PATENT OFFICE

JOHN F. ROBERTS, OF PORTLAND, OREGON

BOX HOOK

Application filed July 28, 1928. Serial No. 295,243.

This invention relates to box hooks and has for an important object thereof the provision of a box hook which may be conveniently disposed within the pocket without danger of the hook tearing the clothing or causing excessive wear thereon.

A further and more specific object of the invention is to provide a box hook having a jointed handle including an accessory portion which may be positioned to engage the bill of the hook to form a protection therefor.

A further object of the invention is to provide in a device of this character means whereby the hook may be swung into alignment with the handle and collapsed theretoward, so that it may be more readily engaged with the accessory of the handle portion.

A still further object of the invention is to produce in a device of this character a construction such that the accessory element of the handle serves not only to engage the bill of the hook, but likewise serves to hold the handle sections in alignment with one another.

These and other objects I attain by the construction shown in the accompanying drawing, wherein for the purpose of illustration is shown a preferred embodiment of my invention and wherein:—

Figure 1 is a front elevation of a hook constructed in accordance with my invention;

Figure 2 is a side elevation thereof;

Figure 3 is a view partially in section showing the hook in folded position;

Figure 4 is a fragmentary view with a portion of the shank housing removed;

Figure 5 is a section on the line 5—5 of Figure 2.

Referring now more particularly to the drawings, the numerals 10 and 11 generally designate a hook element and a handle therefor. The hook element comprises a bill 12 and shank 13, the shank having at its end a head 14, which is irregular in cross section. The handle element includes a hand grip 15 and a shank housing 16. The shank housing 16 is sectional and has the elements thereof held in assembled relation by means of screws 17 or the like. Adjacent faces of these sections are grooved to provide a bore 18 permitting the shank 13 of the hook to slide longitudinally therein when the bill of the hook aligns with the transversely extending hand grip 15. At its lower end, the bore 18 formed by the combination of these grooves has an enlargement 19 permitting rotation of the head therein to place the head transversely with respect to the hand grip. When rotated to this position, the head underlies the edges of the main bore 18, so that the hook is held against longitudinal movement and may not collapse in the bore without again rotating the same in alignment with the handle. The hook may be held in this position by a spring-pressed pin 20, which engages in a socket 21 formed in the head when the hook is in the last named position.

When the hook is collapsed into the housing, this pin engages a socket 22 formed in the shank 13 to prevent casual extension of the shank.

The hand grip 15 is formed in two sections 23 and 24, the section 24 having a socket 25 in which the upper end of the housing 16 is extended and secured. The sections 23 and 24 are hinged to one another, as at 26, to permit the section 23 to be swung downwardly along the shank housing. To maintain the sections in alignment with one another, these sections are provided with a groove 27, the walls of which are undercut and in which is mounted a slide 28. The groove opens through the free end of the section 23 and is enlarged, as at 29, to form a housing for a head 30 formed on the slide. This head serves to permit manipulation of the slide and further is provided with a socket 31 adapted to receive the bill of the hook. When it is desired to store the hook in the pocket, the pin 20 is released from the socket of the head, the hook rotated to align the head 14 thereof with the bore 18 and the shank forced up into the housing. The slide 28 is drawn outwardly until the section 23 may be angularly positioned, as illustrated in Figure 3, and the head 30 of this slide is engaged with the bill of the hook having an opening 31 in which the bill engages. When in this position, the bill of the hook is protected, so that it may not tear holes in the clothing or cause any damage to the person.

To facilitate positioning of the section 23, the hinge 26 is preferably provided with a stop lug 32 which engages the section 24 to limit movement of the section 23 when at the proper position. To assist in maintaining engagement of the head 30 with the bill of the hook, the hook adjacent the bill may be formed with a notch 33 and the head 30 may be provided with a spring catch 34 for engagement in this notch.

It will be obvious that a structure of this character may be readily and cheaply produced and will provide an efficient structure for preventing damage to the person or clothing by the bill of the hook. It will also be obvious that the construction hereinbefore set forth is capable of a certain range of change and modification without materially departing from the spirit of the invention and I accordingly do not limit myself to such specific structure except as hereinafter claimed.

I claim:—

1. In a box hook or the like, a handle including a hand grip and a housing, a hook having a shank slidable in the housing and in one position thereof rotatable from a position where the bill of the hook aligns with the handle to a position where the bill of the hook is disposed at right angles to the handle, means for holding the shank in either of said positions, and means upon the handle extendible to engage the bill of the hook when the hook is in the first named position, said housing and the shank of the hook having coaction with one another preventing rotation of the hook from the first named to the last named position until the hook is extended from the housing.

2. In a box hook or the like, a handle including a hand grip and a housing, a hook having a shank slidable in the housing and in one position thereof rotatable from a position where the bill of the hook aligns with the handle to a position where the bill of the hook is disposed at right angles to the handle, means for holding the shank in either of said positions, and means upon the handle extendible to engage the bill of the hook when the hook is in the first named position, said housing and the shank of the hook having coaction with one another preventing rotation of the hook from the first named to the last named position until the hook is extended from the housing, said shank and housing having coaction when the hook is in the last named position and extended from the housing preventing movement of the shank of the hook into the housing until the hook is rotated to the first named position.

3. In a box hook or the like, a handle including a hand grip and a housing, a hook having a shank slidable in the housing and in one position thereof rotatable from a position where the bill of the hook aligns with the handle to a position where the bill of the hook is disposed at right angles to the handle, means for holding the shank in either of said positions, the handle being formed in two sections one of which is rigid to the housing and the other of which is pivoted to the first named section and movable from a position where it is aligned therewith to a position where it inclines downwardly and outwardly therefrom toward the bill of the hook when in the first named position, and means carried by the last named section of the handle extendible to engage the bill of the hook.

4. In a box hook or the like, a handle including a hand grip and a housing, a hook having a shank slidable in the housing and in one position thereof rotatable from a position where the bill of the hook aligns with the handle to a position where the bill of the hook is diposed at right angles to the handle, means for holding the shank in either of said positions, the handle being formed in two sections one of which is rigid to the housing and the other of which is pivoted to the first named section and movable from a position where it is aligned therewith to a position where it inclines downwardly and outwardly therefrom toward the bill of the hook when in the first named position, and means carried by the last named section of the handle extendible to engage the bill of the hook, said means comprising a slide which in the aligned position of the handle sections is simultaneously engageable with both thereof to hold said sections in assembled relation.

5. In a box hook or the like, a handle including a hand grip and a housing, a hook having a shank slidable in the housing and in one position thereof rotatable from a position where the bill of the hook aligns with the handle to a position where the bill of the hook is disposed at right angles to the handle, means for holding the shank in either of said positions, and means upon the handle extendible to engage the bill of the hook when the hook is in the first named position, said means including a part having engagement with the hook preventing casual displacement thereof.

In testimony whereof I hereunto affix my signature.

JOHN F. ROBERTS.